United States Patent
Takeda

(10) Patent No.: US 8,413,257 B2
(45) Date of Patent: Apr. 2, 2013

(54) DOCUMENT MANAGEMENT SYSTEM, DOCUMENT MANIPULATION APPARATUS, AND COMPUTER READABLE MEDIUM

(75) Inventor: Koji Takeda, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 371 days.

(21) Appl. No.: 12/724,108

(22) Filed: Mar. 15, 2010

(65) Prior Publication Data

US 2011/0066852 A1    Mar. 17, 2011

(30) Foreign Application Priority Data

Sep. 11, 2009   (JP) ................................. 2009-210471

(51) Int. Cl.
*G06F 7/04* (2006.01)
(52) U.S. Cl. ............. 726/27; 358/1.15; 726/26; 726/28; 713/156; 713/168; 713/189
(58) Field of Classification Search .................... 726/27, 726/28; 713/168
See application file for complete search history.

(56) References Cited

U.S. PATENT DOCUMENTS

| | | | |
|---|---|---|---|
| 2004/0192426 A1* | 9/2004 | Masui et al. ..................... 463/16 |
| 2008/0109653 A1* | 5/2008 | Yokohama ..................... 713/156 |
| 2008/0151288 A1* | 6/2008 | Matsunoshita .............. 358/1.15 |
| 2009/0100215 A1* | 4/2009 | Nochimowski ............... 711/103 |
| 2010/0235545 A1* | 9/2010 | Gouraud ........................... 710/5 |

FOREIGN PATENT DOCUMENTS

| | | |
|---|---|---|
| JP | A-10-93550 | 4/1998 |
| JP | A-11-215351 | 8/1999 |
| JP | A-2006-167986 | 6/2006 |
| JP | A-2007-26109 | 2/2007 |
| JP | A-2007-168372 | 7/2007 |

OTHER PUBLICATIONS

One-way and Trap-Door Functions, lecture pp. 14-19; Jan. 16, 1996.*

* cited by examiner

*Primary Examiner* — Taghi Arani
*Assistant Examiner* — Jason Lee
(74) *Attorney, Agent, or Firm* — Oliff & Berridge, PLC

(57) ABSTRACT

According to an aspect of the invention, a document management system includes a protection policy storage unit, a correspondence storage unit, an embedding unit, a portable identification unit, a storage control unit, and a document manipulation unit. The document manipulation unit executes a user manipulation specified by the certain user based on a communication between the portable identification unit and the document manipulation unit.

8 Claims, 8 Drawing Sheets

FIG. 2

| POLICY ID | P0012002 | | |
|---|---|---|---|
| NAME | PROJECT X PUBLIC MATERIAL | | |
| CREATOR | STAFF MEMBER A | | |
| PUBLIC KEY | AQAB, Iga9Y7kaeT78ar83aTIohK3.... | | |
| SECRET KEY | A478SeouGa4REraIE34qk.... | | |
| TARGET | PERMITTED OPERATION | | EXPIRATION DATE |
| DEVELOPMENT DEPARTMENT 1 SECTION | APPLICATION, VIEWING, READING, EDIT, PRINT, SCAN, COPY, FAX | | 2020-12-31 |
| DEVELOPMENT DEPARTMENT 2 SECTION | VIEWING, TICKET ISSUE APPARATUS | | 2020-12-31 |
| MANAGER | VIEWING, READING, PRINT, COPY | | 2020-12-31 |

FIG. 3

| DOCUMENT ID | POLICY ID | REGISTRATION | PERSON REGISTRATION DATE AND TIME |
|---|---|---|---|
| D000000132000 | P0012002 | STAFF MEMBER A | 2009-10-01T11:32:43 |
| D000000132001 | P0012002 | STAFF MEMBER A | 2009-10-01T13:11:20 |
| D000000132002 | P0012005 | STAFF MEMBER B | 2009-10-01T15:51:11 |
| D000000132003 | P0012005 | STAFF MEMBER B | 2009-10-01T15:51:12 |
| D000000132004 | P0012005 | STAFF MEMBER C | 2009-10-02T09:39:22 |
| D000000132005 | P0012001 | STAFF MEMBER D | 2009-10-02T16:05:32 |
| D000000132006 | P0012001 | STAFF MEMBER B | 2009-10-02T16:44:01 |

FIG. 4

| USER | TOKEN ID | TOKEN KEY (UNIQUE SECRET INFORMATION) |
|---|---|---|
| STAFF MEMBER A | T0010001 | ta+IO7a0t4pMn2wb |
| STAFF MEMBER B | T0010002 | 3ltat8Tkt0+2h9/2 |
| STAFF MEMBER C | T0010003 | M8catQ89i924xd6z |
| STAFF MEMBER D | T0010004 | 9%giLik6nwS+3jn% |
| STAFF MEMBER E | T0010005 | Jn25Hl+1vV8akBhv |
| STAFF MEMBER F | T0010006 | rTn4jG%axC39m+bs |
| STAFF MEMBER G | T0010007 | IK8nL+w2ftbS74tF |

FIG. 5

| GROUP | USER |
|---|---|
| DEVELOPMENT DEPARTMENT 1 SECTION | STAFF MEMBER A |
| DEVELOPMENT DEPARTMENT 1 SECTION | STAFF MEMBER B |
| DEVELOPMENT DEPARTMENT 1 SECTION | STAFF MEMBER C |
| DEVELOPMENT DEPARTMENT 2 SECTION | STAFF MEMBER D |
| DEVELOPMENT DEPARTMENT 2 SECTION | STAFF MEMBER E |
| DEVELOPMENT DEPARTMENT 2 SECTION | STAFF MEMBER F |
| MANAGER | STAFF MEMBER B |
| MANAGER | STAFF MEMBER F |

*FIG. 9*

| PUBLIC KEY ID | PUBLIC KEY |
|---|---|
| PK01 | AQAB,taa0t8Tkt4pMn2wb... |
| PK02 | AQAB,M8tat0+2h9/+IO72... |
| PK03 | AQAB,tQ89GE24xd6zkBhv... |
| PK04 | AQAB,9%g6hca3lwS+25Hl... |
| PK05 | AQAB,2n+1vx8akBh5W04h... |
| PK06 | AQAB,rsQ4jG%axC39m+bs... |
| PK07 | AQAB,l84nL+w2ftbS74tF... |

DOCUMENT MANAGEMENT SYSTEM, DOCUMENT MANIPULATION APPARATUS, AND COMPUTER READABLE MEDIUM

CROSS-REFERENCE TO RELATED APPLICATIONS

This application is based upon and claims priority under 35 USC 119 from Japanese Patent Application No. 2009-210471, filed Sep. 11, 2009.

BACKGROUND

Technical Field

This invention relates to a document management system, a document manipulation apparatus, and a computer readable medium.

SUMMARY OF THE INVENTION

According to an aspect of the invention, a document management system includes a protection policy storage unit, a correspondence storage unit, an embedding unit, a portable identification unit, a storage control unit, and a document manipulation unit.

The protection policy storage unit stores at least one piece of a plurality of pieces of document protection policy information, each of the pieces containing a document manipulation condition representing manipulation permitted for a user or a group, each of the pieces being stored in association with a secret key and a public key.

The correspondence storage unit stores a correspondence between electronic documents and the pieces of the document protection policy information.

The embedding unit embeds, in a sheet, public key information indicating the public keys corresponding to a given piece of the document protection policy information assigned to a given electric document of the electric documents when the given electronic document is printed on the sheet to produce a paper document.

The portable identification unit includes unique information and that is assigned to a certain user.

The storage control unit controls the portable identification unit so that authentication support information obtained based on the unique information and the secret key corresponding to a certain piece of the document protection policy information containing the document manipulation condition of manipulation permitted for the certain user or the group to which the certain user belongs and the document manipulation condition of manipulation permitted for the certain user in the certain piece of the document protection policy information are stored in the portable identification device in association with the public key information corresponding to the certain piece of the document protection policy information.

The document manipulation unit executes a user manipulation specified by the certain user to the paper document and includes a command acceptance unit, a public key read unit, a transmission unit, a manipulation execution unit. The command acceptance unit receives a command of the user manipulation for the paper document. The public key read unit reads the public key information embedded in the paper document. The transmission unit transmits a query containing the public key information read by the public key read unit, manipulation information indicating the user manipulation, and authentication data to the portable identification device. The manipulation execution unit executes the user manipulation when it is validated that validation data returned from the portable identification device in response to the query corresponds to the authentication data.

The portable identification device includes a validation data generation unit and a reply unit. The validation data generation unit generates the validation data based on the authentication support information corresponding to the public key information contained in the query, the unique information, and the authentication data contained in the query when the user manipulation indicated by the manipulation information contained in the query transmitted from the transmission unit satisfies the document manipulation condition corresponding to the public key information contained in the query in the document manipulation condition stored in the portable identification unit. The reply unit transmits the generated validation data to the document manipulation apparatus.

BRIEF DESCRIPTION OF THE DRAWINGS

Exemplary embodiments of the invention will be described in detail based on the following figures, wherein:

FIG. 2 is a drawing to show an example of the data description of policy definition;

FIG. 3 is a drawing to show an example of the data description of document management information;

FIG. 4 is a drawing to show an example of information representing the correspondence between user ID and token unique secret information, managed by a ticket issue apparatus;

FIG. 5 is a drawing to show an example of information representing the correspondence between users and groups stored by a directory server;

FIG. 9 is a drawing to show an example of a public key table in a second modified example.

DETAILED DESCRIPTION

Figure 1:
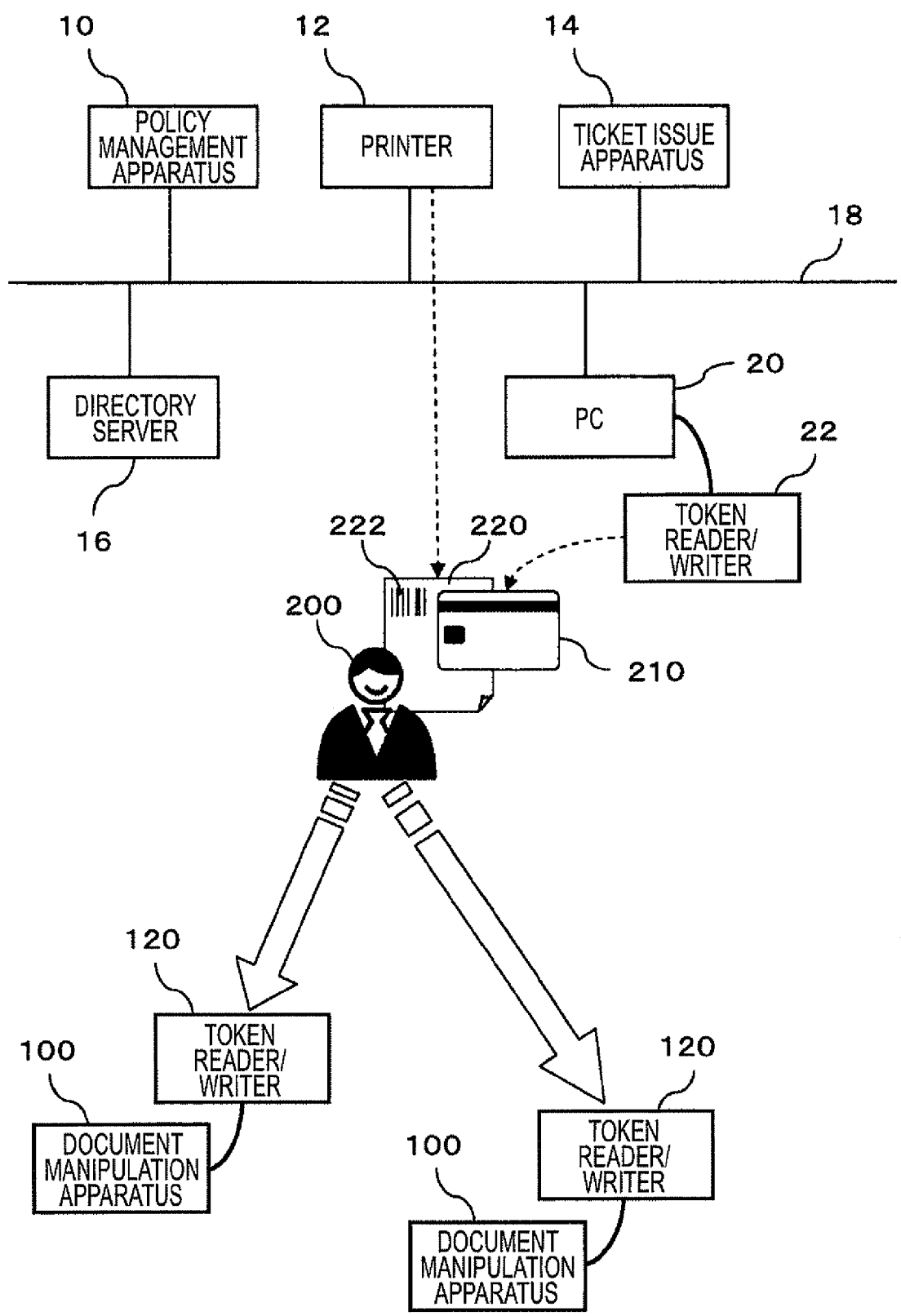
FIG. 1 is a drawing to show an example of the system configuration of an exemplary embodiment of the invention.

FIG. 1 shows an example of the system configuration of an exemplary embodiment of the invention. The system includes a policy management apparatus 10, a printer 12, a ticket issue apparatus 14, a directory server 16, and a PC (personal computer) 20 connected to a network 18 such as a local area network and a document manipulation apparatus 100 not connected to the network 18.

The policy management apparatus 10 is an apparatus for performing control or management for security (information protection) about a document to be managed. The document to be managed also contains a paper document and an electronic document. The electronic document is electronic data representing a document in a predetermined data format. The electronic document also contains a document file created with an application of a word processor, a spreadsheet program, etc., and an image data file provided by scanning a paper document. The paper document is a document provided by writing down or printing the document contents on a paper sheet. The paper document to be managed in the policy management apparatus 10 is a document provided by printing an electronic document to be managed, registered in the policy management apparatus 10. That is, in the system, the electronic document managed by the policy management apparatus 10 is given identification information uniquely indicating the document To print the electronic document, the public key information corresponding to the identification information is printed on a sheet together with the document contents or is written to a record medium of an RFID tag etc., put on the sheet, whereby the paper document of the print result becomes a document to be managed by the policy management apparatus 10.

The policy management apparatus 10 assigns a security policy (which will be hereinafter simply called policy) to each electronic document (by extension a paper document of the print result). The policy is information describing what manipulation is permitted for each user to perform for the document; conversely, the policy is information representing what restriction each user receives on manipulation of electronic document. The policy can also be called document protection policy information indicating the protection policy of each document. Manipulation for a document contains viewing, reading, editing, print, scan, copy, fax transmission, etc.

If the user makes a request for performing one manipulation for one electronic document, the policy management apparatus 10 references the policy assigned to the electronic document and determines whether or not the user is permitted to perform the manipulation for the electronic document. The request is accepted only if the user is permitted to perform the manipulation. Whether or not, not only the user, but also the group to which the user belongs is permitted to perform the manipulation for the electronic document may be determined as described later.

For such control, the policy management apparatus 10 stores policy definition information defining each policy, and document management information indicating which policy is assigned to each document.

FIG. 2 illustrates an example of the data description of the policy definition information. In this example, the policy definition information of one policy contains "policy ID" of identification information of one policy, "name" of the policy, identification information of "creator" creating the policy, a key pair of "public key" and "secret key" given to the policy, and information indicating the descriptions of the policy. The information indicating the descriptions of the policy contains a list of types of manipulation permitted for the user and information indicating the expiration date of the permission for each user (target) permitted to perform manipulation for the document to which the policy is assigned. "Manager" shown in FIG. 2 as an example of "target" is a kind of position of the user in the organization and can be understood as a group made up of "managers" of posts.

In the example in FIG. 2, the policy whose policy ID is "P0012002" indicates that the "name" is "Project X public material," that the policy is created by "staff member A," that members in "Development department 1 section" are permitted to apply the policy to a document and to perform manipulation of viewing, reading, edit, print, scan, copy, and fax transmission to the document to which the policy is applied until Dec. 31, 2020, and the like. In the example, RSA public key cryptosystem is assumed; e of "public key"=(e, n) is "AQAB" and n is "Iga9Y7kaeT78ar83aTIIohK3 . . . " and secret key d is "A478SeouGa4REraIE34qk . . . ". Each of e and n is represented in BASE64 format.

FIG. 3 shows an example of the document management information. In this example, for each document, "document ID" of identification information of the document, "policy ID" of the policy applied to the document, the user ID of "registration person" registering the document in the policy management apparatus 10, and "registration date and time" when the registration was made are contained.

In the examples in FIGS. 2 and 3, it is seen that the members in "Development department 1 section" are permitted to perform manipulation of viewing, reading, edit, print, scan, copy, and FAX transmission for the document whose document ID is "D000000132000" until Dec. 31, 2020.

For example, the creator or the administrator of each document may assign a policy to the document by a known method.

Referring again to FIG. 1, it is assumed that the user operates the PC 20, for example, thereby making a request for one manipulation (for example, print) for an electronic document to which a policy is assigned. In this case, a query containing the document ID of the electronic document, the user ID of the requesting user, and information indicating the type of manipulation requested by the user is sent from the PC 20 to the policy management, apparatus 10. The policy management apparatus 10 determines the policy ID corresponding to the document ID involved in the query from the document management information, determines whether or not the user of the user ID contained in the query is permitted to perform the type of manipulation in the query by referencing the policy definition corresponding to the policy ID, and returns a response containing the determination result to the PC 20. If the response indicates permission, the PC 20 executes the manipulation requested by the user for the document; if the response indicates non-permission, the PC 20 does not execute the manipulation and performs error handling (for example, displays an error message of "the manipulation is not permitted" or the like).

The printer 12 connected to the network 18 prints out the electronic document on a sheet in response to a command through the PC 20 from a user 200. The printer 12 may be a device of a single function of print only or may be a copier or a multiple function device (having multiple functions of print, scan, copy, FAX transmission, etc.,) that can perform network communications.

If the electronic document to be printed is a document managed by the policy management apparatus 10 (namely, a document whose association with the policy is registered in the document management information illustrated in FIG. 3), the printer 12 executes print only if the policy management apparatus 10 permits print. In this case, the printer 12 embeds the public key (e, n) of the policy assigned to the electronic document in a paper document 220 of the print result of the electronic document.

To embed the public key, for example, as the public key, a key represented in the format that can be recognized by a machine like an image code 222 of a bar code, etc., or a character string may be printed on a sheet (for example, a previously specified position on the sheet space) together with the image represented by the electronic document. For example, the PC 20 may generate print data representing an image with a character string or image code 222 representing the public key superposed on the image of the electronic document (for example, described in a page description language) and may send the print data to the printer 12. The printer 12 may superpose the character string or image code of the public key on the image of the electronic document.

If a device containing readable/writable memory such as an RFID tag is placed in a sheet, the printer 12 may write the public key to the device by a writer for writing data into the device.

The public key embedded in the paper document 220 may be provided for the PC 20 (if the PC 20 makes a query as to whether or not print is permitted) or the printer 12 (if the printer 12 makes a query) in the form in which the policy management apparatus 10 associates it with a response to the effect that print is permitted. Alternatively, the electronic document distributed to the PC 20 may be provided with information of the public key as attribute information and when the PC20 receives permission of print from the policy management apparatus 10, the PC 20 may pass the public key to the printer 12 and may give a command for print or write to device.

Hitherto, various methods have been developed for embedding information in the paper document 220 and any of the conventional methods may be used in the exemplary embodiment.

The public key (e, n) is embedded in a sheet, but e may be a fixed value in the whole system of the exemplary embodiment and only n may be varied from one policy to another and only n may be embedded in the sheet.

The PC 20 is a personal computer operated by the user and manipulates an electronic document according to various installed applications. In the example, a token reader/writer 22 is connected to the PC 20. The token reader/writer 22 is a device for reading/writing data from/to a token 210 carried by the user.

The token 210 is an identification card uniquely assigned to each user and has memory for storing data, a processor for executing computation processing for authentication described later, and a program describing the computation processing. The token 210 may be an IC card, a USB token, etc., that can transfer data to and from an external system in a contact or non-contact manner, for example.

The memory included in the token 210 stores unique secret information (u) uniquely given to the token 210 and a ticket (T) issued by the ticket issue apparatus 14. The unique secret information (u) is authentication information of the token 210 (by extension the user carrying the token 210) and cannot be rewritten. The ticket (T) is information indicating the permission condition of manipulation for a document, given to the user to whom the token 210 is assigned. The ticket (T) is issued from the ticket issue apparatus 14 for each policy permitting some manipulation for the user. The memory in the token 210 can also store more than one ticket (T). A specific example of the information descriptions contained in the ticket (T) is described later in detail.

If the user inputs a paper document into the standalone document manipulation apparatus 100 described later and makes a request for manipulation for the paper document, when receiving a set of a random number (r), the public key (e, n) of the paper document, and operation description (o) requested by the user 200 as a challenge (C) from the document manipulation apparatus 100, the processor of the token 210 determines the ticket (T) corresponding to the public key (e, n) and checks that the requested operation description (o) satisfies a condition (L) described in the ticket (T) and then calculates a response (R) from a ticket key (t) and the condition (L) contained in the ticket (T), token unique secret information (u), and random number (r) and returns the response to the document manipulation apparatus 100.

A program for acquiring the ticket (T) from the ticket issue apparatus 14 and writing the ticket (T) into the token 210 through the token reader/writer 22 is installed in the PC 20. When the user 200 starts the program of the PC 20 and requests the ticket issue apparatus 14 to issue a ticket (T), the ticket issue apparatus 14 issues the ticket (T) corresponding to the user 200. The program writes the ticket (T) issued from the ticket issue apparatus 14 into the token 210 set in the token reader/writer 22.

In the example, the user 200 operates the PC 20 including the token reader/writer 22 to acquire the ticket (T), but may acquire the ticket (T) in the token 210 through any other type of apparatus including the token reader/writer 22, such as a multiple function device connected to the network 18.

The ticket issue apparatus 14 issues a ticket (T) corresponding to the user 200 in response to the user 200. The ticket issue apparatus 14 manages token unique secret information (u) for each token 210 of each user 200 and information indicating which user 200 has which token (for example, information representing the correspondence between the user ID and the token unique secret information illustrated in FIG. 4). For the token 210 possessed by the user permitted to perform manipulation for the document in the policy managed in the policy management apparatus 10, the ticket issue apparatus 14 generates a ticket key (t) from at least the secret key (d) associated with the policy, the unique secret information (u) of the token 210, and a condition (L) as the description of the manipulation described in the policy ("permitted manipulation" in FIG. 2), and issues a ticket (T) containing a set of the ticket key (t), the condition (L), and the public key (e, n) of the policy.

For example, in the ticket issue processing, first the user 200 operates the PC 20, logs in the ticket issue apparatus 14 through the network 18, and requests ticket issue. The ticket issue apparatus 14 reads the unique secret information (u) of the token 210 assigned to the user 200 and requests the policy management apparatus 10 to send information of the policy permitting some manipulation for the user. Upon reception of the request, the policy management apparatus 10 checks the managed policy definition information, determines the policy permitting some manipulation for the user, returns information containing the public key (e, n) of the policy (if e is fixed in the system, only n may be contained), a list of "permitted manipulations" for the user, and the "expiration date" of the permission for each determined policy to the ticket issue apparatus 14. The "permitted manipulations" for the user contain not only the manipulations permitted for the user, but also the manipulations performed for the group to which the user belongs. Which group the user belongs to may be determined by referencing the directory server 16. The directory server 16 stores information representing the group to which each user belongs, as illustrated in FIG. 5.

A flow of the ticket issue processing of the ticket issue apparatus 14 will be discussed with a specific example. If the PC 20 requests the ticket issue apparatus 14 to issue a ticket for the token possessed by staff member A, the ticket issue apparatus 14 sends a query about the policy relating to the staff member A to the policy management apparatus 10. The policy management apparatus 10 knows that the staff member A is involved in the policy of "Project X public material" and is permitted to perform manipulations of viewing, reading, edit, print, scan, copy, and FAX transmission for the document to which the policy is assigned until Dec. 31, 2020. The manipulation "application" is manipulation of applying (assigning) the policy to the document. Such manipulation is not required for the document already subjected to policy assignment and registered in the policy management apparatus 10 and thus in this case, "application" is not contained in the list of the permitted manipulations. The policy management apparatus 10 returns a response containing the public key of the policy (e="AQAB," n="Iga9Y7kaeT78ar83aTIIohK3..."), a list of the permitted manipulations (viewing, reading, edit, print, scan, copy, FAX), and information expiration date of the permission (Dec. 31, 2020) to the ticket issue apparatus 14.

Upon reception of the response, the ticket issue apparatus 14 defines the condition (L) as follows:

L="operation=[view, edit, print, scan, copy, fax];
valid_to=[2020-12-31]"

where "operation=[ ]" represents a list of the permitted manipulations and the description "[view, edit, print, scan, copy, fax]" represents the manipulation types of viewing (reading), edit, print, scan, copy, FAX transmission respectively. "valid_to=[2020-12-31]" indicates that the expiration date of the list of the permitted manipulations is Dec. 31, 2020. The ticket issue apparatus 14 calculates the ticket key (t) according to the following expression:

$$t=d-f(u,n,L) \bmod \Phi(n)$$

In the above formula, f (u, n, L) is a one-way function having the token unique secret information (u), modulus of the public key (n), and the condition (L) as arguments; a secure hash function of SHA, etc., is an example of the one-way function. $\Phi(n)$ is an Euler function; when n=p*q in RSA cipher, $\Phi(n)=(p-1)(q-1)$.

The ticket issue apparatus 14 generates information containing a combination of the found condition (L), the ticket key (t), and the public key (e, n) as a ticket (T) and distributes it to the token 210 through the PC 20.

Here, if the condition (L) different in the position as "development department 2 section" and the position as "manager" in the policy of "P0012002" like staff member F, both rights (namely, list of the permitted manipulation types) may be ORed and one ticket may be issued with the result as L or tickets may be issued for the individual positions.

If the user is involved in a plurality of policies, the ticket issue apparatus 14 may issue as many tickets as the number of policies involved; instead, a list of the policies in which the user is involved may be presented to the user through the PC 20 and a ticket may be issued only for the policy selected by the user out of the list.

The ticket (T) thus issued is written to the token 210 through the token reader/writer 22.

The ticket (T) may be issued by a method in a conventional art.

In the example described above, the policy management apparatus 10, the ticket issue apparatus 14, and the directory server 16 are separate apparatus; this mode is only one example. Two or more of the functions of the three apparatus may be installed in one apparatus, of course.

The document manipulation apparatus 100 is an apparatus for reading a paper document and performing manipulation about the document image of the read result. A copier, a multiple function device, a scanner, a FAX machine, etc., is an example of the document manipulation apparatus 100. Here, it is assumed that the document manipulation apparatus 100 is in a state in which it cannot communicate with the policy management apparatus 10. This state contains not only the case where the document manipulation apparatus 100 is in a standalone state (namely, the document manipulation apparatus 100 is not connected to any network), but also the case where the document manipulation apparatus 100 is connected to a network not connected to the policy management apparatus 10.

In this case, even if a document ID is embedded in the paper document, the policy management apparatus 10 cannot be queried as to whether or not the user inputting the paper document has the right to perform the user-requested manipulation. Then, in the exemplary embodiment, whether or not the user-requested manipulation is to be permitted is determined in cooperation of the public key information of the policy embedded in the paper document and the token 210 carried by the user.

Figure 6:
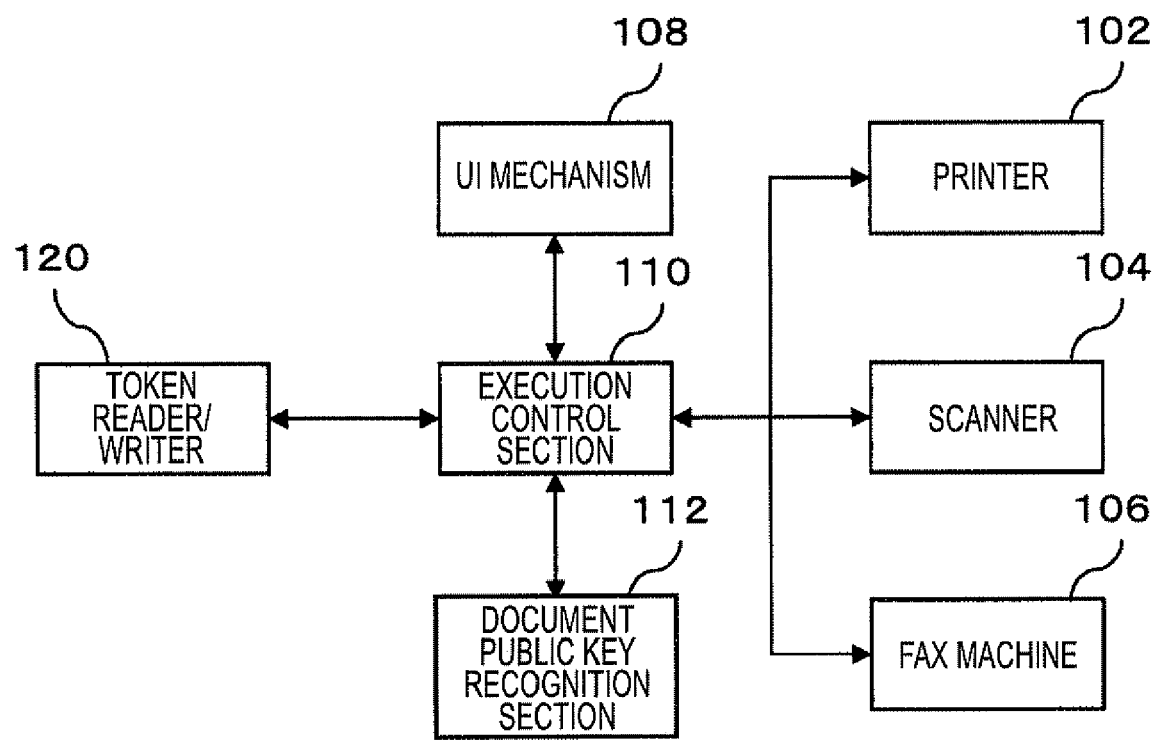
FIG. 6 is a drawing to show an example of the internal configuration of a document manipulation apparatus.

FIG. 6 shows an example of the internal configuration of the document manipulation apparatus 100. In this example, the document manipulation apparatus 100 is a multiple function device. In this case, the document manipulation apparatus 100 includes a printer 102 for printing an image on a sheet, a scanner 104 for optically reading an image on a sheet space of a document, and a FAX machine 106 for performing FAX communications with an external device through a telephone line. To copy a paper document, an image read through the scanner 104 is printed on a sheet on the printer 102. A UI (user interface) mechanism 108 is a user interface for displaying the state of the document manipulation apparatus 100 and accepting user's input to the document manipulation apparatus 100. The UI mechanism 108 includes an input/output device of a liquid crystal touch panel, mechanical buttons of ten keys, a start button, etc., and the like and programs for menu display for the input/output device, interpretation of input from the input/output device, etc. For example, the user specifies the type of manipulation desired by the user, such as copy, scan, or FAX transmission, for the UI mechanism 108. Although not shown, the document manipulation apparatus 100 may include a communication device for communicating with a network (however, this network is not connected to the policy management apparatus 10) and may receive a print command from a device on the network and may print on the printer 102 in response to the command.

An execution control section 110 controls the printer 102, the scanner 104, or the FAX machine 106 in response to a command of the user 200 input through the UI mechanism 108 or a command of the user from another device through the network, thereby executing processing responsive to the command of the user 200. When the execution control section 110 receives a command of manipulation for a paper document 220 set in a document feed unit (not shown) of the scanner 104 or a platen from the user through the UI mechanism 108, the execution control section 110 determines whether or not to permit the manipulation. This determination is made using the public key (e, n) embedded in the paper document 220 and the token 210 carried by the user 200. For the determination, a document public key recognition section 112 recognizes the embedded public key from the setup paper document 220 to be manipulated. For example, if the public key is printed on the paper document 220 in the form of an image code of a bar code, etc., the image code is determined from the image provided by scanning the paper document 220 and the determined image code is analyzed, whereby the value of the public key represented by the code may be recognized. If the public key is stored in a device of an RFID tag, etc., put on the paper document 220, the public key may be acquired by communicating with the device. The token 210 carried by the user 200 is set in a token reader/writer 120 attached to the document manipulation apparatus 100 and communicates with the execution control section 110 through the token reader/writer 120.

If the user gives a command of manipulation of copy, scan, FAX transmission, etc., for the paper document 220 with the public key embedded therein, the execution control section 110 executes right authentication, namely, determines whether or not the user is permitted to perform the manipulation for the document by executing the following steps. In the example, it is assumed that the public key is printed on the paper document 220 in the form of an image code.

(1) The paper document 220 is scanned and the image code 222 of the public key embedded in the sheet space is read and is recognized, whereby the public key (e, n) is determined.
(2) A random number (r) is generated and a set of the random number (r), the public key (e, n), and manipulation description specified by the user (o) (for example, copy, FAX transmission, etc.,) is transmitted as a challenge (C) to the token 210 of the user through the token reader/writer 120.
(3) A response (R) to the challenge (C) is received from the token 210.
(4) Whether or not the response (R) corresponds to the challenge (C) is determined using the public key (e, n) determined at step (1).
(5) The manipulation specified by the user is executed only if the check result is correct.

Figure 7:
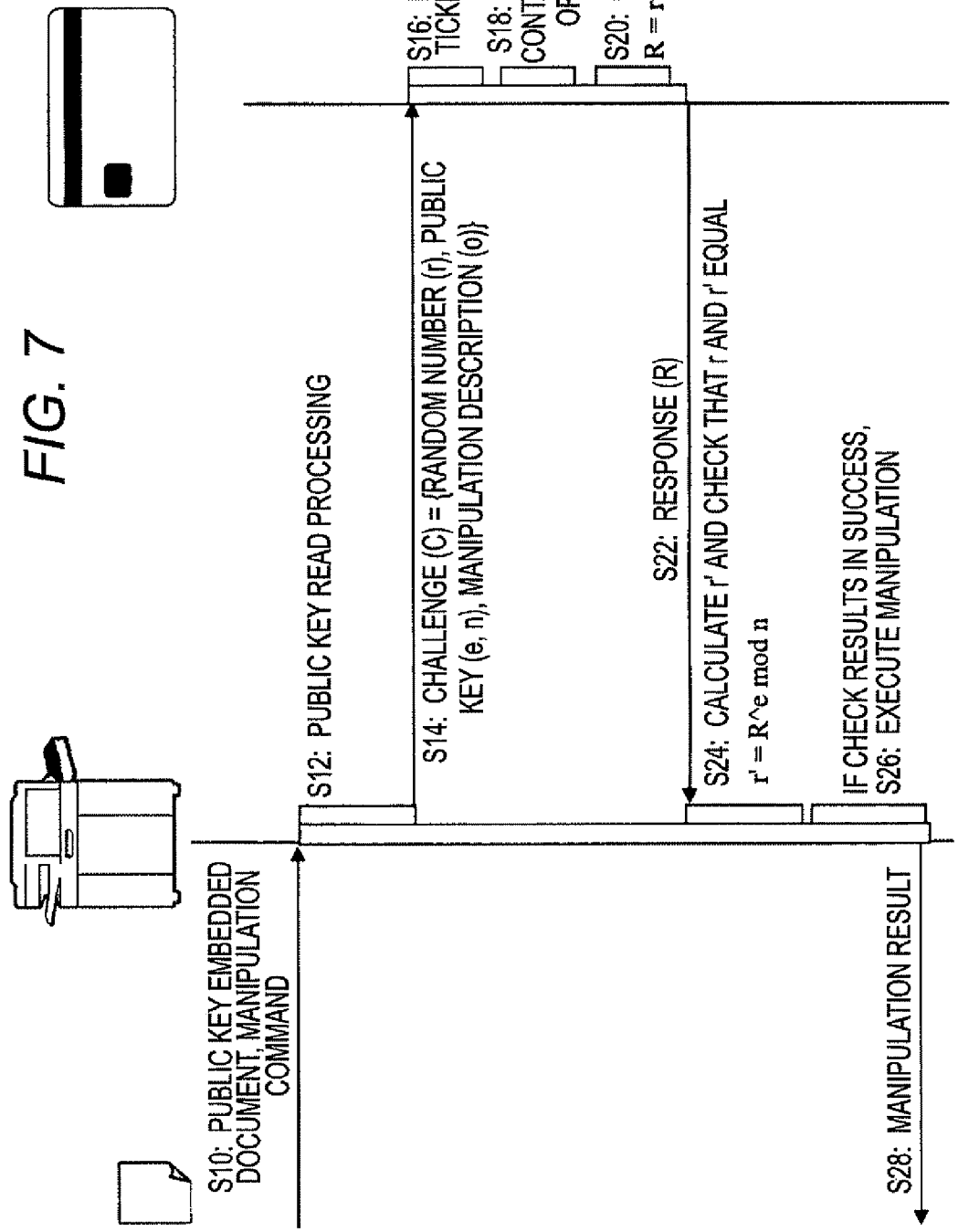
FIG. 7 is a sequence chart to describe an example of a processing flow in the system of the exemplary embodiment of the invention.

Next, a flow of processing performed when the user sets a paper document in the document manipulation apparatus 100 and gives a manipulation command will be discussed containing processing performed by the token 210 with reference to FIG. 7.

If the user sets a paper document in a document reader of the scanner 104 and gives a command of manipulation for the document (for example, copy, FAX transmission, etc.,) from the UI mechanism 108 (S10), the scanner 104 reads an image of the paper document and the document public key recognition section 112 recognizes the public key (e, n) from the image (S12). The execution control section 110 generates a random number (r) and transmits a set of the generated random number (r), the recognized public key (e, n), and manipulation description specified by the user (o) to the token 210 through the token reader/writer 120 as information of the challenge (C) (S14).

Upon reception of the challenge (C), the token 210 searches memory of the token for a ticket (T) containing the public key (e, n) contained in the challenge (C) (S16). If the corresponding ticket (T) is not found, it is determined that the user does not have the right to manipulate the document, and error information is returned to the execution control section 110. Upon reception of the error information, the execution control section 110 presents a message indicating that the user does not have the right to perform the specified manipulation through a display of the UI mechanism 108, for example, and terminates the processing.

If the corresponding ticket (T) is found, the token 210 determines whether or not the manipulation description (o) contained in the challenge (C) satisfies the condition (L) contained in the ticket (T) (S18). Specifically, if the condition (L) contained in the ticket (T) is L="operation=[view, edit, print, scan, copy]; valid_to=[2020-12-31]"

and the user-input manipulation description (o) is o="operation=copy"

the manipulation description is contained in the operation list of the condition (L). Then, further the token 210 determines whether or not the current time indicated by an internal clock of the execution control section 110 is before Dec. 31, 2020 of the expiration date contained in the condition (L). If the condition of the expiration date is also satisfied, it is determined that the condition (L) is satisfied.

For example, if the manipulation description (o) is o="operation=fax"

or if the current time is after Dec. 31, 2020, it is determined that the condition (L) is not satisfied. If the condition (L) is not satisfied, the memory is searched for another ticket (T) corresponding to the public key (e, n) of the paper document and if such a ticket is found, whether or not the condition (L) is satisfied is determined. If the ticket (T) corresponding to the public key (e, n) is not found in the memory, the token 210 determines that the requesting user does not have the right to manipulate the document, and returns error information to the document manipulation apparatus 100.

If the ticket (T) satisfying the condition (L) is thus found, the token 210 calculates response (R) according to the following expression, for example, (S20) and returns the response (R) to the execution control section 110 (S22):

$$R = r^d \cdot r^{f(u,n,L)} \bmod n$$

Upon reception of the response (R) from the token 210, the execution control section 110 calculates r' according to the following expression and determines whether or not the calculation result is equal to the random number r generated at S14 (S24):

$$r' = R^e \bmod n$$

If r and r' equal, it is determined that right authentication results in success, and the manipulation for the paper document is executed (S26) and the manipulation result is output (S28). If r and r' do not equal, it is determined that right authentication results in failure and the user is notified of the fact and the processing is terminated.

If the token 210 returns the correct response (R), $$\begin{aligned}
r' &= R^e \bmod n \\
&= (r^d \cdot r^{f(u,n,L)})^e \bmod n \\
&= (r^{(d-f(u,n,L))} \cdot r^{f(u,n,L)})^e \bmod n \\
&= (r^{(d-f(u,n,L)+f(u,n,L))})^e \bmod n \\
&= (r^d)^e \bmod n \\
&= r^{d \cdot e} \bmod n \\
&= r
\end{aligned}$$

and r' and r become equal.

Thus, the document manipulation apparatus 100 determines whether or not the user has the right to perform the requested manipulation for the paper document from the public key embedded in the paper document and the token 210 carried by the user. At the determination time, the document manipulation apparatus 100 need not communicate with the policy management apparatus 10.

In the example, the calculation result of the sign value using the ticket (T) and the token 210 for the random number r is used as the response (R) and the sign is validated using the public key (e, n), but the validation method is not limited to the method based on the sign validation mentioned above. For example, a random number (r) may be generated and may be encrypted using the public key (e, n). A set of the encrypted random |number| ($r^e \bmod n$), the public key (e, n) of the paper document, and the manipulation description (o) requested by the user may be calculated, in a similar manner, as a challenge (C) using the ticket (T) and the token 210. And validation may be conducted based on the fact that the random number ($r^e \bmod n$) which is encrypted using the public key (e, n) and is contained in the challenge (C) is decrypted correctly.

If the token 210 returns the correct response (R), $$R = ((r^e)^t \cdot (r^e)^{f(u,n,L)}) \bmod n$$
$$= (r^t \cdot r^{f(u,n,L)})^e \bmod n$$
$$= (r^{(d-f(u,n,L))} \cdot r^{f(u,n,L)})^e \bmod n$$
$$= (r^{(d-f(u,n,L)+f(u,n,L))})^e \bmod n$$
$$= (r^d)^e \bmod n$$
$$= r^{d \cdot e} \bmod n$$
$$= r$$

and the response (R) becomes equal to the first generated random number (r).

Next, a modified example will be discussed. In the exemplary embodiment described above, if the token 210 does not have a ticket, the ticket key (t) cannot be estimated and thus authentication does not result in success. However, the condition (L) is checked in the token 210 and thus if the token 210 has the ticket (T) issued for the policy, it is also considered that the condition (L) is ignored and response (R) is generated for illegal action. To improve such a point, the following modified example will be discussed:

The policy management apparatus 10 and the printer 12 operate in a similar manner to that in the exemplary embodiment described above and will not be discussed again. The ticket issue apparatus 14 also operates in an almost similar manner to that in the exemplary embodiment described, but differs in that a sign value (sign) for the ticket key (t) and the condition (L) is contained in addition to the ticket key (t) and the condition (L) as the ticket (T).

T=[t,L,sign]

The sign value (sign) is a value of digital sign provided by applying the secret key of the ticket issue apparatus 14 to [t, L], for example. Such a ticket (T) is associated with the public key (e, n) of the policy and is stored in the token 210.

Figure 8:
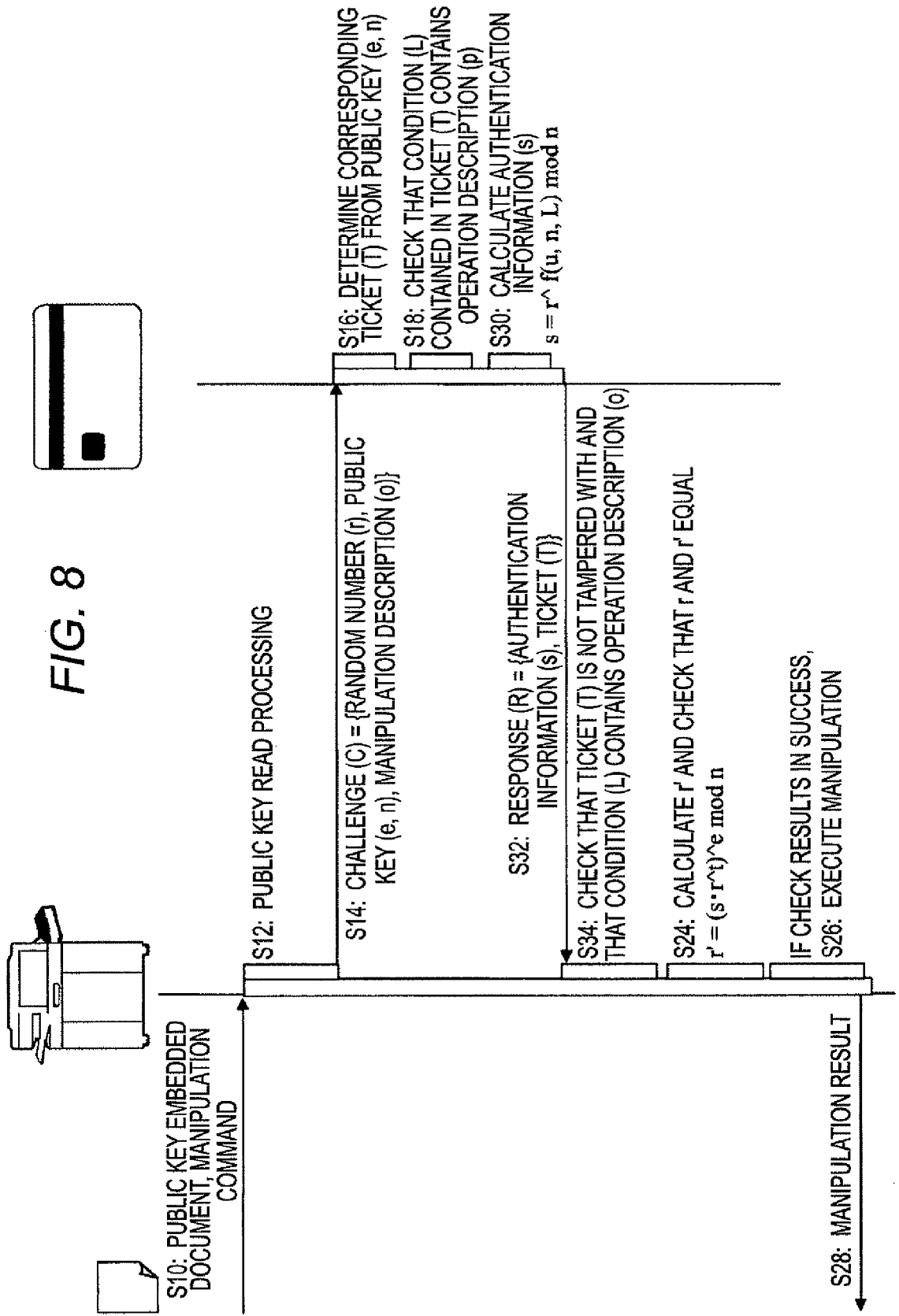
FIG. 8 is a sequence chart to describe an example of a processing flow in a modified example.

A processing flow of the modified example will be discussed with reference to FIG. 8.

Steps S10 to S18 are similar to those of the exemplary embodiment described above and therefore will not be discussed again. In the modified example, the token 210 calculates authentication information (s) according to the following expression (S30) and returns a set of determined ticket (T) and authentication information (s) to the document manipulation apparatus 100 as a response (R) (S32):

$$s = r^{f(u,n,L)} \bmod n$$

Upon reception of the response (R) from the token, the execution control section 110 checks whether or not the ticket (T) contained in the response (R) is tampered with based on the sign value (sign) contained in the ticket (T) (S34). In the sign check, for example, the public key of the ticket issue apparatus 14 (the public key is previously registered in the document manipulation apparatus 100) may be used. If tampering of the ticket (T) is detected by the sign check, it is assumed that illegal action is conducted and the user is notified of the fact and the processing is terminated.

If it is known that tampering of the ticket (T) is not detected by the sign check, then the execution control section 110 checks that the operation description (o) input by the user at S10 satisfies the condition (L) contained in the ticket (T) (S34). If the operation description (o) does not satisfy the condition (L), it is assumed that illegal action is conducted and the user is notified of the fact and the processing is terminated. If all checks result in success, the execution control section 110 calculates r' according to the following expression and determines whether or not the calculation result is equal to the random number r generated at S14 (S24):

$$r' = (r^t \cdot s)^e \bmod n$$

If r and r' equal, it is determined that authentication results in success, and the manipulation for the paper document is executed (S26). If r and r' do not equal, it is determined that authentication results in failure and the user is notified of the fact and the processing is terminated.

If the token 210 returns the correct response (R), $$r' = (r^t \cdot s)^e \bmod n$$
$$= (r^t \cdot r^{f(u,n,L)})^e \bmod n$$
$$= (r^{(d-f(u,n,L))} \cdot r^{f(u,n,L)})^e \bmod n$$
$$= (r^{(d-f(u,n,L)+f(u,n,L))})^e \bmod n$$
$$= (r^d)^e \bmod n$$
$$= r^{d \cdot e} \bmod n$$
$$= r$$

and r and r' become equal to each other.

Thus, in the modified example, the execution control section 110 of the document manipulation apparatus 100 of the validating side checks whether or not the manipulation specified by the user satisfies the condition (L) contained in the ticket (T). An attack of deceiving the document manipulation apparatus 100 by tampering with the condition (L) contained in the ticket (T) in the response (R) is considered; however, such tampering can be detected by validating the sign (sign) of the ticket (T). A different ticket (a ticket corresponding to a different policy or a ticket corresponding to a different token 210) can also be contained in the response (R); in this case, however, the correspondence between the ticket key (t) and the authentication information (s) calculated in the token 210 comes undone and r and r' do not become equal.

Also in the example, the sign value is calculated using the ticket (T) and the token 210 for the random number (r) and the sign is validated using the public key (e, n), whereby it is validated that the response (R) corresponds to the challenge (C). As in the exemplary embodiment described above, the random number (r) previously encrypted using the public key (e, n) is contained in the challenge (C) and is decrypted using the ticket (T) and the token 210 and it may be validated that the response (R) corresponds to the challenge (C) based on the fact that the result becomes equal to the former random number (r) (correctly decrypted).

Next, a second modified example will be discussed.

The amount of information embedded in a sheet space by print is limited. Thus, the public key (e, n) may be unable to be embedded depending on the embedding method (for example, format of image code). Avoidance means will be discussed in the second modified example.

In the modified example, the public key ID for uniquely identifying the public key is embedded in a paper document in place of the public key (e, n) of the policy. A public key table for representing the correspondence between the public key ID and the public key (e, n) is previously registered in each document manipulation apparatus 100, as shown in FIG. 9. For example, the descriptions of the public key table may be preset at the shipment time so that they are common in all document manipulation apparatus 100. In this case, the policy management apparatus 10 may assign the public key in the table to each policy and when a document is printed out on the printer 12, the public key ID of the policy assigned to the document may be embedded in the sheet space. The document manipulation apparatus 100 may be able to later import the public key generated at the creating time of the policy Before manipulation, the document manipulation apparatus 100 recognizes the public key ID from the sheet space of the paper document and references the public key table, thereby determining the public key (e, n) corresponding to the public key ID. The operation other than determining the public key may be the same as that in the exemplary embodiment or the first modified example and therefore will not be discussed again.

The policy management apparatus 10, the ticket issue apparatus 14, the PC 20, and the execution control section 110 of the document manipulation apparatus 100 illustrated above are implemented by causing a general-purpose computer to execute programs representing the processing of the function modules described above, for example. The computer has a circuit configuration wherein a microprocessor of a CPU, etc., memory of random access memory (RAM), read-only memory (ROM), etc., an HOD controller for controlling an HOD (hard disk drive), various I/O (input/output) interfaces, a network interface for controlling connection to a network such as a local area network, and the like as hardware are connected through a bus, for example. A disk drive for reading from and/or writing to a portable disk record medium of a CD, a DVD, etc., a memory reader-writer for reading from and/or writing to portable nonvolatile record media of various standards such as flash memory, and the like may be connected to the bus through the I/O interface, for example. The programs describing the processing of the function modules illustrated above are stored in fixed storage of a hard disk drive, etc., via a record medium of a CD, a DVD, etc., or via communication means of a network, etc., and are installed in the computer. The programs stored in the fixed storage are read into the RAM and are executed by the microprocessor, whereby the function modules illustrated above are implemented. Some or all of the function modules may be implemented as a hardware circuit of a dedicated LSI (Large Scale Integration), an ASIC (Application Specific Integrated Circuit), an FPGA (Field Programmable Gate Array), etc.

The foregoing description of the exemplary embodiment of the present invention has been provided for the purpose of illustration and description. It is not intended to be exhaustive or to limit the invention to the precise forms disclosed. Obviously, many modifications and various will be apparent to practitioners skilled in the art. The embodiments were chosen and described in order to best explain the principles of the invention and its practical application, thereby enabling other skilled in the art to understand the invention for various embodiments and with the various modifications as are suited to the particular use contemplated. It is intended that the scope of the invention be defined by the following claims and their equivalents.

What is claimed is:

1. A document management system comprising:
   a protection policy storage unit that stores at least one piece of a plurality of pieces of document protection policy information, each of the pieces containing a document manipulation condition representing manipulation permitted for a certain user or a group, each of the pieces being stored in association with a secret key and a public key;
   a correspondence storage unit that stores a correspondence between electronic documents and the pieces of the document protection policy information;
   an embedding unit that embeds, in a sheet, public key information indicating the public keys corresponding to a given piece of the document protection policy information assigned to a given electronic document of the electronic documents when the given electronic document is printed on the sheet to produce a paper document, the piece of the document protection policy information corresponding to user manipulation which is allowed to be performed for the paper document;
   a portable identification unit that includes unique information and that is assigned to the certain user;
   a storage control unit that controls the portable identification unit so that authentication support information obtained based on the unique information and the secret key corresponding to a certain piece of the document protection policy information containing the document manipulation condition of manipulation permitted for the certain user or the group to which the certain user belongs and the document manipulation condition of manipulation permitted for the certain user in the certain piece of the document protection policy information are stored in the portable identification unit in association with the public key information corresponding to the certain piece of the document protection policy information; and
   a document manipulation unit that executes a user manipulation specified by the certain user to the paper document and that includes:
      a command acceptance unit that receives a command of the user manipulation for the paper document;
      a public key read unit that reads the public key information embedded in the paper document;
      a transmission unit that transmits a query containing the public key information read by the public key read unit, manipulation information indicating the user manipulation, and authentication data to the portable identification unit; and
      a manipulation execution unit that executes the user manipulation when it is validated that validation data returned from the portable identification unit in response to the query corresponds to the authentication data,
   wherein the portable identification unit includes:
      a storage unit which stores the user manipulation which is allowed to be performed for the paper document and public key information corresponding to the user manipulation;
      a validation data generation unit that generates the validation data based on the authentication support information corresponding to the public key information contained in the query, the unique information, and the authentication data contained in the query when the user manipulation indicated by the manipulation information contained in the query transmitted from the transmission unit satisfies the document manipulation condition corresponding to the public key information contained in the query in the document manipulation condition stored in the portable identification unit; and
      a reply unit that transmits the generated validation data to the document manipulation apparatus via a reader/writer connected to the document manipulation apparatus.

2. The document management system as claimed in claim 1
wherein the authentication support information is obtained based on the secret key, the unique information, and the document manipulation condition of manipulation permitted for the certain user or the group to which the certain user belongs, and the validation data generation unit generates the validation data based on the authentication support information, the unique information, the authentication data, and the document manipulation condition stored in the portable identification unit and corresponding to the public key information contained in the query.

3. A document management system comprising:

a protection policy storage unit that stores at least one piece of a plurality of pieces of document protection policy information, each of the pieces containing a document manipulation condition representing manipulation permitted for a certain user or a group, each of the pieces being stored in association with a secret key and a public key;

a correspondence storage unit that stores a correspondence between electronic documents and the pieces of the document protection policy information;

an embedding unit that embeds, in a sheet, public key information indicating the public keys corresponding to a given piece of the document protection policy information assigned to a given electronic document of the electronic documents when the given electronic document is printed on the sheet to produce a paper document;

a portable identification unit that includes unique information and that is assigned to the certain user;

a storage control unit that controls the portable identification unit so that authentication support information obtained based on the unique information and the secret key corresponding to a certain piece of the document protection policy information containing the document manipulation condition of manipulation permitted for the certain user or the group to which the certain user belongs and the document manipulation condition of manipulation permitted for the certain user in the certain piece of the document protection policy information are stored in the portable identification unit in association with the public key information corresponding to the certain piece of the document protection policy information; and a document manipulation unit that executes a user manipulation specified by the certain user to the paper document and that includes:
  a command acceptance unit that receives a command of the user manipulation for the paper document;
  a public key read unit that reads the public key information embedded in the paper document;
  a transmission unit that transmits a query containing the public key information read by the public key read unit and authentication data to the portable identification unit; and
  a manipulation execution unit that executes the manipulation specified by the certain user when the user manipulation satisfies the document manipulation condition contained in response data from the portable identification unit to the query and it is validated that validation data calculated using the authentication support information contained in the response data, validation support data contained in the response data, and the authentication data corresponds to the authentication data, wherein the portable identification unit includes:
  a validation support data generation unit that generates the validation support data based on the authentication data contained in the query transmitted from the transmission unit and the unique information; and
  a reply unit that transmits the response data containing the document manipulation condition, the authentication support information and the validation support data, the document manipulation condition and the authentication support information corresponding to the public key information contained in the query.

4. The document management system as claimed in claim 3
wherein the authentication support information is obtained based on the secret key, the unique information, and the document manipulation condition of manipulation permitted for the certain user or the group to which the certain user belongs, and the validation support data generation unit generates the validation support data based on the authentication data, the unique information, and the document manipulation condition stored in the portable identification unit and corresponding to the public key information contained in the query.

5. The document management system as claimed in claim 1, wherein the authentication data includes a random number r.

6. The document management system as claimed in claim 5, wherein when t is a ticket key associated with the certain user, u is the unique information, n is the public key information, L is the user manipulation which is allowed to be performed for the paper document, and f(u, n, L) is a one-way function, the validation data includes a response R calculated according to the following formula:

$$R = r^t \times r^{f(u,n,L)} \times \mathrm{mod}(n).$$

7. The document management system as claimed in claim 6, wherein the document manipulation apparatus validates that the validation data corresponds to the authentication data when $r = R^e \bmod n$.

8. The document management system as claimed in claim 1, wherein when d is the secret key information, u is the unique information, n is the public key information, L is the user manipulation which is allowed to be performed for the paper document, mod $\Phi(n)$ is an Euler function, and f(u, n, L) is a one-way function, the authentication support information comprises a ticket T including a combination of condition L, the public key information n, and a ticket key, wherein the ticket key is calculated according to the following formula:

$$T = d - f(u,n,L) \times \bmod \Phi(n).$$

* * * * *